Oct. 30, 1951  K. L. SHAFER  2,573,226
LOCK WASHER
Filed Oct. 11, 1946
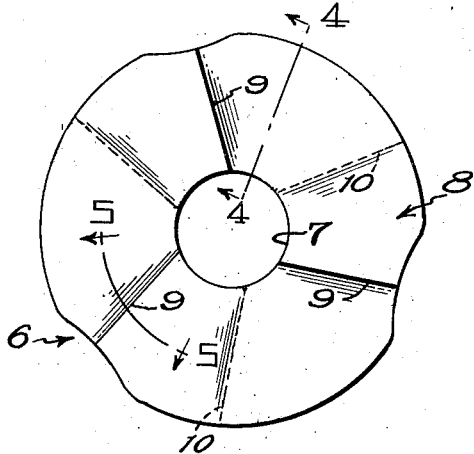
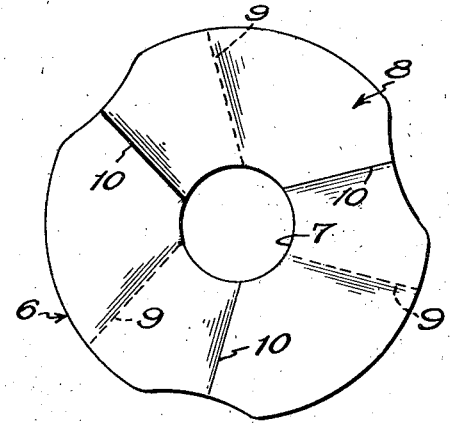
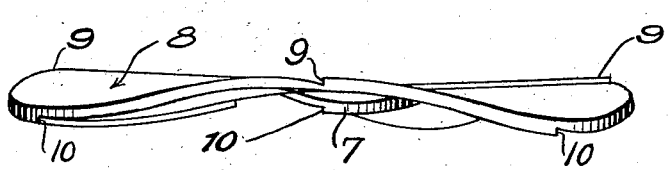
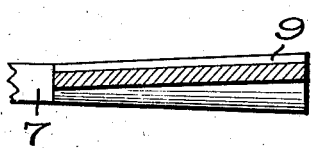
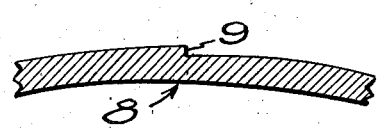
*Inventor*
Kenneth L. Shafer
By Randolph & Beavers
*Attorneys*

Patented Oct. 30, 1951

2,573,226

UNITED STATES PATENT OFFICE 2,573,226

LOCK WASHER

Kenneth L. Shafer, Buffalo, N. Y.

Application October 11, 1946, Serial No. 702,811

3 Claims. (Cl. 151—35)

This invention relates to a novel construction of lock washer for use in preventing disengagement of two threadedly connected elements or of two elements which are connected together by threaded means.

More particularly, it is an object of the invention to provide a novel construction of lock washer having shoulders on opposite faces thereof which are constructed and arranged to bite into the connected elements when said elements are turned in a direction for disengagement thereof for preventing rotation of the elements relatively to one another and to the lock washer in a disengaging direction.

A further particular object of the invention is to provide a lock washer wherein the shoulders or cutting edges are disposed at substantial angles to radii of the washer for executing a shearing cut into the adjacent faces of the elements retained thereby to better enable the lock washer to become secured to each of said elements and to form an interlocking connection therebetween.

Still a further object of the invention is to provide a lock washer of substantially uniform thickness throughout of undulating shape on each side thereof and wherein the ridges of the undulations are angularly disposed relatively to radii of the washer body and the locking shoulders or edges, on both sides of the washer body are disposed along the ridges or high points of said undulations for not only executing a shear-like penetration of the adjacent surfaces of the interlocked members but whereby, when said interlocked members are brought into close proximity, the washer body will be flattened and compressed therebetween and retained under stress so that any tendency of the interlocked elements to move away from one another will cause the locker washer to resume its undulating shape to thereby move the shoulders or edges thereof toward the adjacent faces of said interlocked members.

Still a further object of the invention is to provide a lock washer of the aforedescribed construction and shape which is non-circular in its normal condition and which is deformable into substantially circular shape by compression between two elements to be interlocked thereby.

Various other objects and advantages of the invention will hereinafter become more fully apparent from the following description of the drawing, illustrating a preferred embodiment thereof, and wherein:

Figure 1 is a plan view of one side of a lock washer constructed in accordance with a preferred embodiment of the invention;

Figure 2 is a similar view of the opposite side of the lock washer;

Figure 3 is an enlarged edge elevational view thereof;

Figure 4 is a sectional view taken substantially along a plane as indicated by the line 4—4 of Figure 1, and Figure 5 is a sectional view taken substantially along a plane as indicated by the line 5—5 of Figure 1.

Referring more specifically to the drawing, the improved lock washer in its entirety is designated generally 6 and may be formed of any suitable resilient metal which is sufficiently hard or tempered to maintain the shoulders or cutting edges thereof, as will hereinafter become apparent. The washer 6 is provided with a central opening 7 which may be of any suitable diameter depending upon the diameter of the bolt or threaded shank, not shown, that it is adapted to engage. The body portion 8 of the lock washer 6 is relatively wide and of substantially uniform thickness and is of undulating shape in substantially a circumferential direction, as clearly illustrated in Figure 3. The ridges and valleys on each side or face of the lock washer body 8 are disposed at substantial angles to radii of the washer 6. The two sides of the body 8 are provided with shoulders 9 and 10 which extend along the high points of said ridges and parallel thereto. One side of the washer body 8 is provided with three substantially correspondingly spaced shoulders 9 each of which faces in the same direction and the opposite side of the body portion 8 is likewise provided with three correspondingly spaced corresponding shoulders 10 each of which face in the opposite direction to the three shoulders 9. As indicated in full and dotted lines in Figures 1 and 2, the shoulders 9 and 10 are circumferentially spaced relatively to one another.

From the foregoing it will be readily apparent that when the washer 6 is interposed between two elements to be connected by a threaded connection, as for example two bars to be connected by a nut and bolt fastening, not shown, as the threaded fastening is tightened the tendency of rotation of the elements to be connected, by the tightening operation, will be in a direction so that the adjacent faces of the elements which bear on the opposite sides of the washer 6 will tend to turn in a direction to ride over the outer or rounded sides of the shoulders 9 and 10. As the elements to be connected are drawn together by the screw fastening, the washer 6 will be compressed between the adjacent faces of said elements and substantially flattened therebetween for rendering the washer substantially flat rather than of undulating curvature, as illustrated in Figure 3. Should the connected elements tend to turn in the opposite direction or in a direction for loosening the screw fastening, by means of which they are connected, the shoulders or edges 9 and 10 will bite into said adjacent faces and, due to their angular disposition, this biting in or penetrating action will be accomplished by a shearing engagement of the shoulders with said adjacent faces. Furthermore, as the connected members tend to move away from one another the lock washer 6, which has been held under compression and stress therebetween, will tend to resume its normal, undulating shape as seen in Figure 3, so that the shoulders or edges 9 and 10 will be projected toward said adjacent faces for more effectively penetrating the surfaces thereof to lock the members against turning movement in a disengaging direction. It will thus be readily apparent that the lock washer 6 will function in two unique ways for insuring penetration of the outer edges of its shoulders with the surfaces of the adjacent faces of the elements, between which it is disposed.

It will be noted that when the washer is flattened between two elements the shoulders 9 and 10 will be caused to turn outwardly away from the faces or sides of the washer body so that said shoulders will then be disposed at obtuse angles to the plane of the flattened washer. Consequently, should the connected elements tend to turn in directions for loosening the screw fastening and for permitting said elements to be displaced away from one another so that the washer could return to or toward its normal undulating shape of Figure 3, the shoulders 9 and 10 will swing back toward their positions of Figure 3, perpendicular to the plane of the washer and as this occurs and in so moving will tend to execute shearing cuts into the adjacent faces of the elements between which the washer is disposed. In addition to the outer edges of the shoulders cutting at angles to radii of the washer into adjacent faces of elements between which the washer is disposed as said elements tend to work loose, the resiliency of the washer body will cause the peripheral portion of the washer to spring outwardly with greater force and to a greater extend away from the plane of the flattened washer than the inner portion of said washer, and consequently the outer end of the cutting or shearing edges of the shoulders will cut with a greater force and to a greater depth thus accomplishing a shearing cut since the depth of the cut will diminish as to each shoulder from the periphery of the washer toward the opening 7.

It will likewise be readily apparent that the washer 6 could be interposed between a single member and a nut and bolt fastening so that one side thereof would bear against a side of said member and the opposite side of the washer would bear against the inner face of the nut of the fastening, to function in the same manner in connection therewith, as previously described.

Various modifications and changes are contemplated and may obviously be resorted to, without departing from the spirit and scope of the invention, as hereinafter defined by the appended claims.

I claim:

1. In a lock washer, an uninterrupted washer body formed of relatively resilient metal provided with a central opening and of substantially uniform thickness throughout, said washer body being of undulating configuration in a direction substantially circumferentially thereof, the ridges, formed by the undulating surfaces of each side of the washer body, being disposed at substantial angles to radii of the washer, said sides of the washer body being provided with shoulders extending longitudinally along the high points of said ridges, the shoulders on one side of the washer body being all disposed to face in the same direction and in the opposite direction to the shoulders on the other side of said body, and the shoulders on each side of the body being correspondingly spaced and being staggered with respect to the shoulders on the opposite side of the body.

2. A lock washer comprising an uninterrupted washer body formed of a resilient metal, said washer body having a central opening and being of undulating formation in a direction generally circumferentially thereof to define ridges on each side of the washer body disposed at substantial angles to radii of the washer, said washer body being of substantially uniform thickness and having shoulders on each side thereof, the shoulders extending along the ridges of the sides at substantial angles to radii of the washer, the shoulders on one side all facing in one direction and the shoulders on the opposite side all facing in the opposite direction, each of said shoulders and ridges being inclined from its outer to its inner end.

3. A lock washer as in claim 2, said shoulders defining shearing edges each extending from the opening to the periphery of the washer, the inner end of each shearing edge constituting a leading end thereof for execution of a shearing cut due to the angular disposition of its shoulder relatively to a radius of the washer.

KENNETH L. SHAFER.

REFERENCES CITED

The following references are of record in the file of this patent:

UNITED STATES PATENTS

| Number | Name | Date |
|---|---|---|
| 179,931 | Loomis | July 18, 1876 |
| 1,162,566 | Bushyeager | Nov. 30, 1915 |
| 1,323,188 | Himphris | Nov. 25, 1919 |
| 1,834,247 | Lillig | Dec. 1, 1931 |

FOREIGN PATENTS

| Number | Country | Date |
|---|---|---|
| 315,639 | Great Britain | July 18, 1929 |
| 721,415 | France | Dec. 22, 1931 |